United States Patent [19]
Golze

[11] 4,260,314
[45] Apr. 7, 1981

[54] ROOF TOP CARRIER

[76] Inventor: Richard R. Golze, 637 Kingsley Trail, Bloomfield Hills, Mich. 48013

[21] Appl. No.: 926,940

[22] Filed: Jul. 21, 1978

[51] Int. Cl.³ .............................................. B60R 9/04
[52] U.S. Cl. .................................... 414/462; 224/310; 414/21
[58] Field of Search ................ 414/21, 462, 541, 542, 414/543, 544; 177/136, 139; 224/310

[56] References Cited

U.S. PATENT DOCUMENTS

| | | | |
|---|---|---|---|
| Re. 23,546 | 9/1952 | Dempster | 414/544 |
| 222,853 | 12/1879 | Ascher | 177/136 X |
| 2,567,104 | 9/1951 | DiFonzo | 414/462 |
| 3,126,069 | 3/1964 | Shepley | 177/136 |
| 3,531,006 | 9/1970 | Farchmin | 414/462 |
| 3,586,183 | 6/1971 | Shaffer | 414/544 |
| 3,823,839 | 7/1974 | Petzing et al. | 414/462 |

FOREIGN PATENT DOCUMENTS 2617754  11/1977  Fed. Rep. of Germany ........... 414/542

*Primary Examiner*—Leslie J. Paperner

[57] ABSTRACT

A roof top carrier for vehicles having a frame to be supported by the roof of a vehicle, a transport mechanism supported by the frame, a housing supported by the transport mechanism for transporting the housing away from its stored position on the roof down to the side of the vehicle to its loading and unloading position and back again to its stored position without any substantial change of the vertical or horizontal orientation of the housing.

15 Claims, 7 Drawing Figures

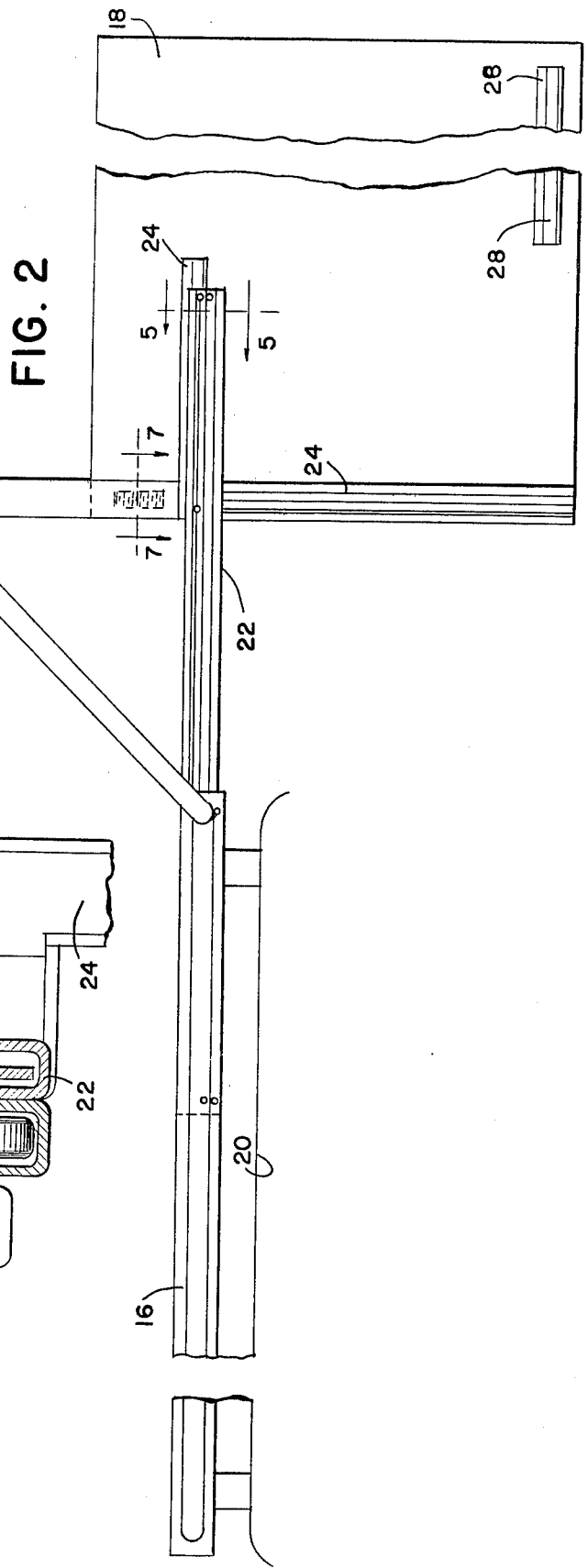
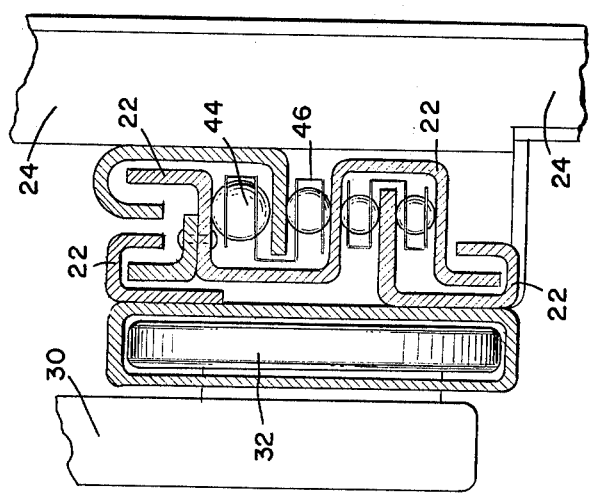
FIG. 2
FIG. 5

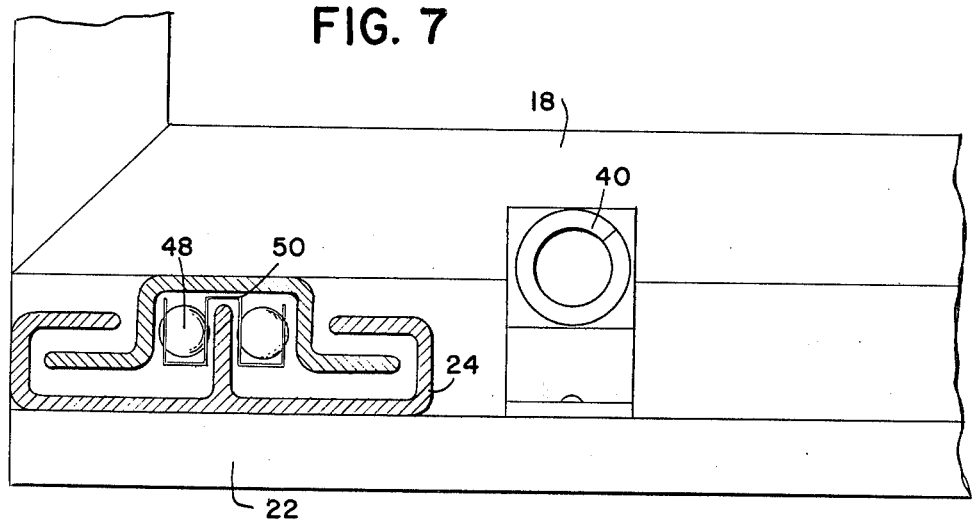
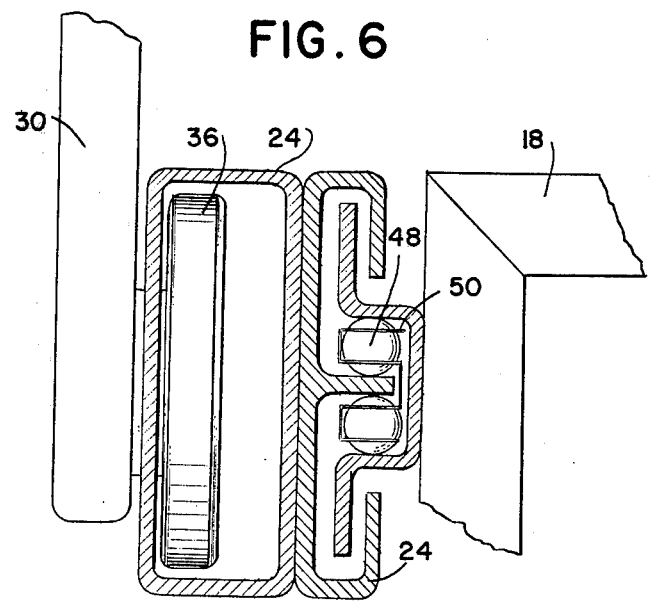

ROOF TOP CARRIER

BACKGROUND OF THE INVENTION

1. Field of the Invention

This invention relates to roof top carriers for vehicles and, more particularly, to roof top carriers adapted to carry luggage and the like on vehicle roofs.

2. Description of the Prior Art

The prior art is replete with various forms of roof top carriers and these prior art roof top carriers are typically adapted for a specific application such as carrying and storage of boats, tents, wheelchairs and the like. These prior art forms of roof top carriers are typically complex in nature using cables, chains, multiple roller tracks and a typical list of the prior art patents may be as follows:

| U.S. Pat. Nos. | 2,395,173 | 3,756,648 | 3,999,673 |
|---|---|---|---|
| | 2,486,316 | 3,823,839 | 4,003,485 |
| | 2,668,646 | 3,905,499 | 4,024,971 |
| | 2,715,974 | 3,954,199 | |
| Canadian Patents | 672,587 | 994,719 | |
| British Patent | 1,248,970 | | |
| Swiss Patent | 381,537 | | |
| West German OLS | 2,150,124 | | |

None of the above examples of the prior art are suitable for the present day automotive environment which is being shaped by the energy crisis and the resulting down-sizing of automobiles by the large automobile manufacturers. One of the major effects of this down-sizing is the reduction in the cargo carrying capability of automobiles. The present invention expands the cargo carrying capability of an automobile without materially affecting the performance characteristics of that automobile. It has the further distinct advantage of bringing the storage housing to the side of the automobile without any change in the vertical or horizontal orientation of that housing. Accordingly, luggage and like can be loaded and unloaded into the housing without any undue lifting which is particularly important in cases of older or infirmed people.

SUMMARY OF THE INVENTION

It is a primary object of the present invention to provide a roof top carrier for vehicles comprising a frame supported by the roof of the vehicle and transport means supported by the frame. A housing is supported by the transport means for transporting the housing away from its stored position on the roof down to the side of the vehicle to its loading and unloading position and back again to the stored position without any substantial change of the vertical or horizontal orientation of the housing.

Another object of the present invention is to provide a roof top carrier for vehicles wherein the transport means includes first and second telescoping slidable arms.

Another object of the present invention is to provide a roof top carrier for vehicles wherein the first telescoping slidable arms are slidably received and horizontally supported by the frame by bearings for transporting the housing generally horizontally away from the stored position on the roof of the vehicle.

Another object of the present invention is to provide a roof top carrier for vehicles wherein the second telescoping slidable arms ar slidably received and vertically supported by a frame member by bearings. The frame member is carried by the first telescoping slidable arms for transporting the housing generally vertically down to the side of the vehicle to its loading and unloading position.

Another object of the present invention is to provide a roof top carrier for vehicles wherein first travel limiting means is provided on the first telescoping slidable arms to limit the horizontal travel of the housing away from the stored position on the roof of the vehicle.

Another object of the present invention is to provide a roof top carrier for vehicles wherein second travel limiting means is provided on the second telescoping slidable arms to limit the vertical travel of the housing down to the side of the vehicle to its loading and unloading position.

Another object of the present invention is to provide a roof top carrier for vehicles wherein the frame comprises a plurality of members at least two of which are substantially parallel to each other and positioned on the roof perpendicular to the longitudinal axis of the vehicle; there being one each of the parallel members fore and aft of the housing when it is in its stored position.

Another object of the present invention is to provide a roof top carrier for vehicles wherein the first telescoping slidable arms include telescoping slidable arms received within the parallel frame members and the frame members are generally horizontal with respect to the vehicle roof.

Another object of the present invention is to provide a roof top carrier for vehicles wherein there are at least two first telescoping slidable arms telescopingly received within each of the parallel frame members.

Another object of the present invention is to provide a roof top carrier for vehicles wherein at least one of the first telescoping slidable arms is horizontally fixedly attached to the housing. The horizontally fixedly attached telescoping slidable arm is horizontally slidably removable from the other telescoping slidable arms received within the parallel frame members. The housing is free to be transported generally vertically downward by the second telescoping slidable arms to the side of the vehicle to its loading and unloading position when the horizontally fixedly attached telescoping slidable arm is so removed from the other telescoping slidable arms.

Another object of the present invention is to provide a roof top carrier for vehicles wherein the frame members carried by the first telescoping slidable arms are vertical thereto; there being one each vertical frame member fore and aft of the housing.

Another object of the present invention is to provide a roof top carrier for vehicles wherein there are at least two second telescoping slidable arms telescopingly received with each vertical frame member.

Another object of the present invention is to provide a roof top carrier for vehicles wherein at least one of the second telescoping slidable arms is vertically fixedly attached to the housing for transporting the housing generally vertically downward to the side of the vehicle to its loading and unloading position.

Another object of the present invention is to provide a roof top carrier for vehicles wherein the housing is a box like structure having at least two sides and a bottom for the storage of objects.

Another object of the present invention is to provide a roof top carrier for vehicles wherein there are one each first telescoping slidable arms horizontally fixedly attached to the fore and aft sides of the housing.

Another object of the present invention is to provide a roof top carrier for vehicles wherein there are one each second telescoping slidable arms vertically fixedly attached to the fore and aft sides of the housing.

Another object of the present invention is to provide a roof top carrier for vehicles wherein the first travel limiting means includes a connecting rod connecting one of the parallel frame members and one of the vertical frame members.

Another object of the present invention is to provide a roof top carrier for vehicles wherein there are two connecting rods, one each connecting one parallel frame member and vertical frame member on the fore and aft sides of the housing.

Another object of the present invention is to provide a roof top carrier for vehicles wherein the end of the connecting rods connected to the parallel frame members are each provided with a roller journaled thereon. The roller is captured by and rolls within a substantially "C" shaped opening provided on substantially the entire length of the parallel frame members.

Another object of the present invention is to provide a roof top carrier for vehicles wherein the end of the connecting rods connected to the vertical frame members are each provided with a roller journaled thereon. The roller is captured by and rolls within a substantially "C" shaped opening provided on a portion less than the entire length of the vertical frame members.

Another object of the present invention is to provide a roof top carrier for vehicles wherein the bearings slidably supporting the first telescoping slidable arms on the parallel frame members are spherical balls maintained in rolling relation with the parallel frame members and the first telescoping slidable arms by cage members.

Another object of the present invention is to provide a roof top carrier for vehicles wherein locking means are provided to lock the housing to the frame when the housing is in its stored position.

Another object of the present invention is to provide a roof top carrier for vehicles wherein power assist means is provided to assist the movement of the housing from its stored position to its loading and unloading position and back again.

Another object of the present invention is to provide a roof top carrier for vehicles wherein the power assist means includes a motor supported by the frame and operatively connected to the housing.

Another object of the present invention is to provide a roof top carrier for vehicles wherein the power assist means includes a counter weight mechanism supported by the frame and operatively connected to the housing.

Another object of the present invention is to provide a roof top carrier for vehicles wherein the housing has four sides and a top and bottom, at least one side being hingedly connected to the housing to present an opening for the storage and removal of objects within the housing.

Another object of the present invention is to provide a roof top carrier for vehicles comprising a frame to be supported by the roof of a vehicle. A weight sensing means is operatively supported by the frame to measure and indicate the weight of the objects being carried by the frame. An alarm means is operatively connected to the weight sensing means to provide an alarm when the weight of the objects exceeds a predetermined amount. The alarm means provides at least one alarm signal remote from the weight sensing means.

Another object of the present invention is to provide a roof top carrier for vehicles wherein a weight sensing means is operatively supported by the frame to measure and indicate the weight of objects being stored in the housing.

Another object of the present invention is to provide a roof top carrier for vehicles wherein the alarm means is operatively connected to the weight sensing means to provide an alarm when the weight of the stored objects exceeds a predetermined amount. Another object of the present invention is to provide a roof top carrier for vehicles wherein the alarm means provides at least one alarm signal remote from the weight sensing means.

It is a further object of the present invention to provide a roof top carrier for vehicles which is inexpensive to manufacture using high volume automated techniques.

A further object of the present invention is to provide a roof top carrier for vehicles which is safe to use and will not significantly impair the performance characteristics of the vehicle with which it is associated.

Another important object of the present invention is to provide a roof top carrier for vehicles which may be easily manipulated into its stored and loading and unloading position. The latter position of which can be at such a height from the ground as to render the housing readily accessible.

Further features, advantages and objects of the present invention will become apparent from the detailed description of the preferred embodiment thereof particularly when made with reference to the accompanying drawings as below outlined.

BRIEF DESCRIPTION OF THE DRAWINGS

FIG. 2 is a side elevational view of the roof top carrier of FIG. 1 wherein the housing is in its loading and unloading position.

FIG. 5 is a partial sectional view taken along the line 5—5 of FIG. 2.

FIG. 6 is a partial sectional view taken along the line 6—6 of FIG. 2.

FIG. 7 is a partial sectional view taken along the line 7—7 of FIG. 2.

DESCRIPTION OF THE INVENTION

The present invention provides an improved roof top carrier 10 particularly adapted for vehicles and, more particularly, for automobiles 12 of all shapes and sizes. As before mentioned, significant and radical change is taking place in the automobile industry in that the overall size of the vehicles is being reduced. This "down-sizing" by most of the auto makers has been due in part to continual increasing costs of energy and, more particularly, gasoline. Accordingly, the roof top carrier 10 provides certain unique and beneficial characteristics which basically expand the cargo carrying capability of such down-sized automobiles without significantly affecting the performance or safety characteristics of the automobile with which it is associated.

Figure 1:
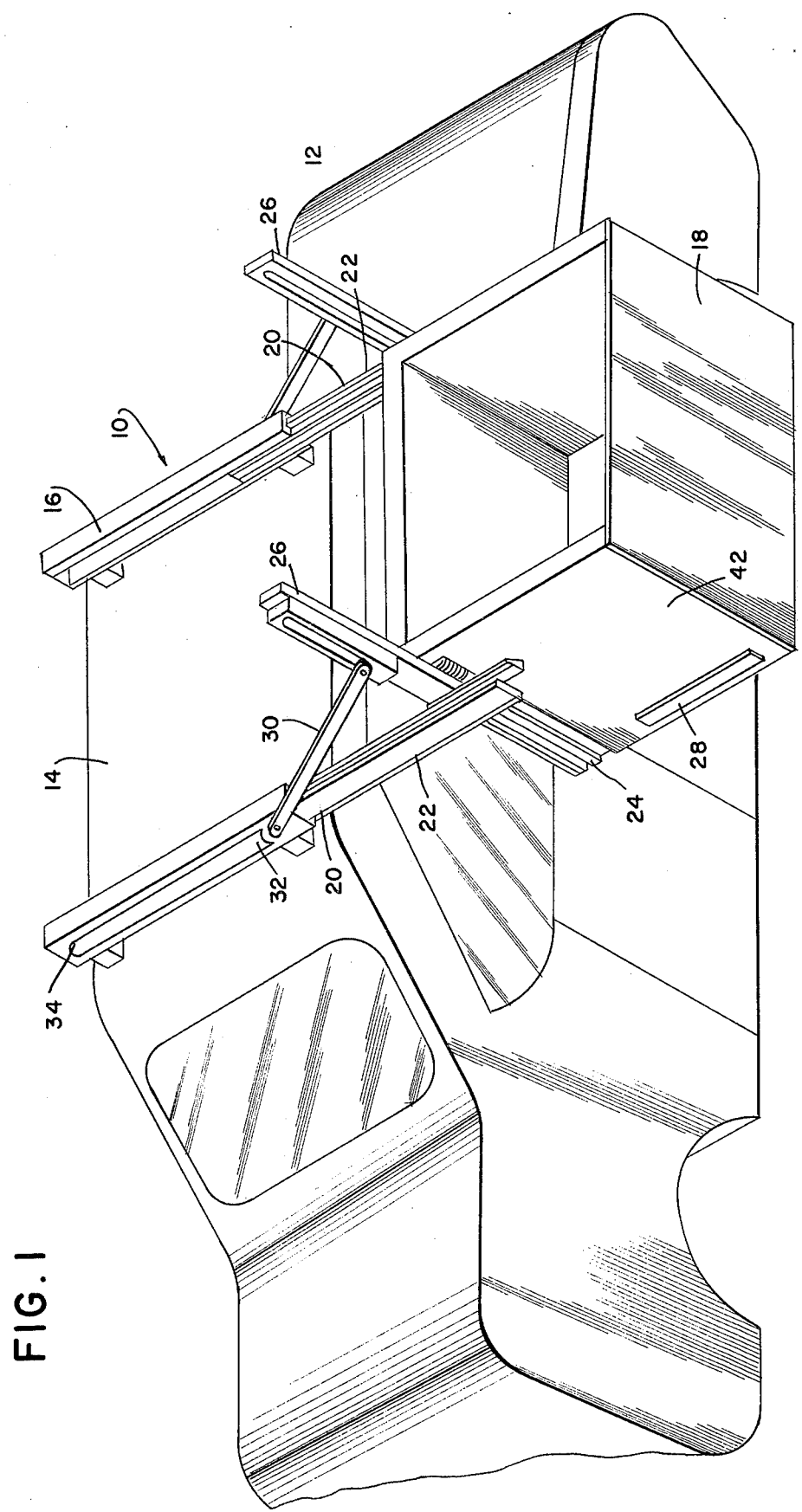
FIG. 1 is a side view of a vehicle with a roof top carrier, in accordance with the present invention, supported by the vehicle roof; the housing of the roof top carrier being in the loading and unloading position.
Figure 3:
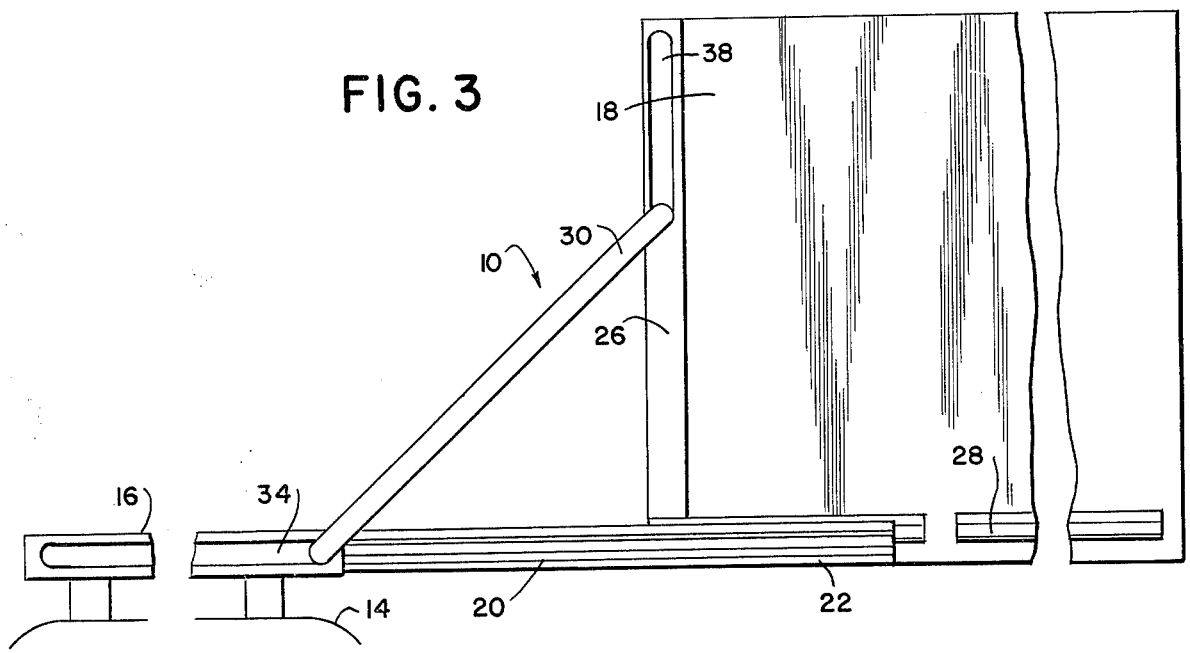
FIG. 3 is a side elevational view of the roof top carrier of FIG. 1 wherein the housing is intermediate its stored and its loading and unloading position.
Figure 4:
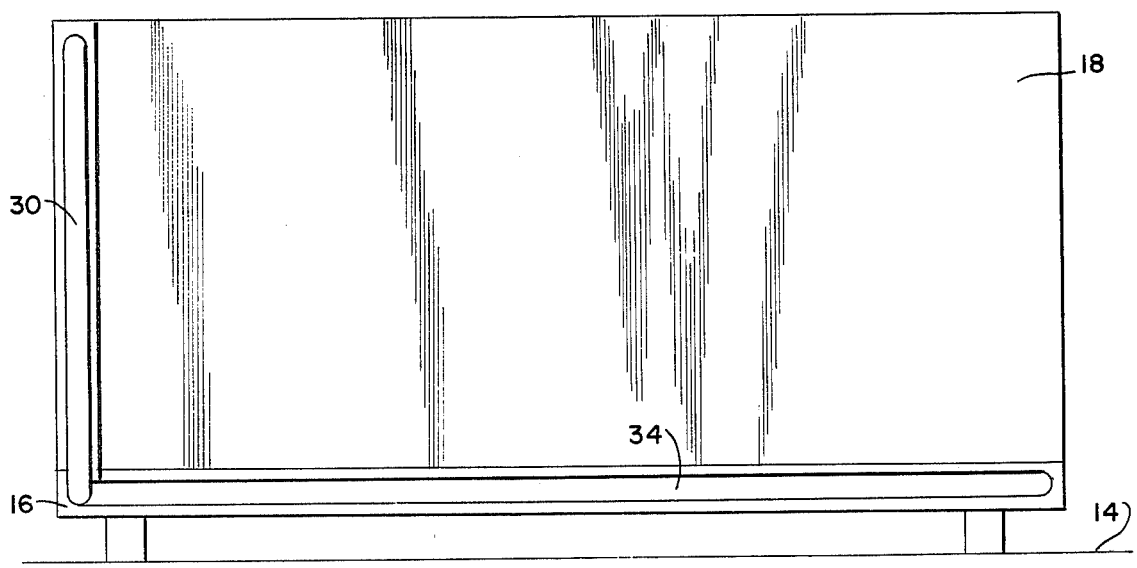
FIG. 4 is a side elevational view of the roof top carrier of FIG. 1 wherein the housing is in its stored position.

The roof top carrier 10 is basically supported by the automobile 12 roof 14. More specifically, the roof top carrier 10 is provided with a frame 16 which is suitably attached to the roof 14 by appropriate connecting means (not shown) such as suction cups, threaded fasteners, belted connectors, all of which are state of the art hardware. The roof top carrier 10 is provided with a housing 18 which is adapted to receive objects such as luggage (not shown) for the carrying thereof on the roof 14 of the automobile 12. The roof top carrier 10, as contemplated by the present invention, includes a transport means 20, which will be described in greater detail below. The transport means 20 is provided to transport the housing 18 from its stored position, as shown in FIG. 4 of the drawings, through an intermediate position, as shown in FIG. 3 of the drawings, to the loading and unloading position, both as shown in FIGS. 1 and 2 of the drawings. This is accomplished without any substantial change in the vertical or horizontal orientation of the housing 18, i.e., the housing may be moved through a complete cycle without ever changing its upright orientation with respect to the vehicle.

The transport means 20 which effects the transporting of the housing 18 generally includes first telescoping slidable arms 22 and second telescoping slidable arms 24. The first telescoping slidable arms 22, as their name implies, are telescopingly and slidably received by the frame 16. The manner in which the first telescoping slidable arms are received by the frame can be generally analogized to that structure which effects the slidable action of filing cabinets and the like, i.e., the first telescoping slidable arms are appropriately supported by bearings in a manner to be described below to move in and out of the frame 16 to transport the housing 18 horizontally away from the stored position, as shown in FIG. 4, to its intermediate position, as shown in FIG. 3.

The second telescoping slidable arms 24 are vertically supported by a frame member 26 which is carried by and affixed to the first telescoping slidable arms 22 as by welding, riveting or the like. Accordingly, as the first telescoping slidable arms 22 are moved out of the frame 16, the second telescoping slidable arms 24 are moved therewith within the frame member 26 which is affixed to the first telescoping slidable arms 22. In a typical roof top carrier 10, as contemplated by the present invention, there will be a frame 16, first and second telescoping slidable arms 22 and 24 and a frame member 26 provided both fore and aft of the housing 18 to provide equal support on each side thereof. The frames 16 will be parallel to each other and will be so positioned on the roof 14 to be perpendicular to the longitudinal axis of the automobile or vehicle 12 with which it is associated. Being so positioned on the roof top carrier 10, the frame members 16 will also be generally horizontal with respect to the vehicle roof 14.

As can best be seen in FIG. 3, the housing 18 can be moved horizontally by the first telescoping slidable arms 22 away from the frame 16 and its stored position, as shown in FIG. 4, to a point at which one of the first telescoping slidable arms 22 is slidably removed from the other of such telescoping slidable arms. At this point the housing 18 is free to be transported generally vertically downward by means of the second telescoping slidable arms 24 to the side of the automobile 12 to its loading and unloading position, as shown in both FIGS. 1 and 2. The horizontal travel of the housing 18 away from its stored position is limited by travel limiting means provided on the first telescoping slidable arms 22. More particularly, the travel limiting means includes a connecting rod 30 which is angularly disposed toward and connects the frame 16 to the vertical frame member 26. The connecting rod 30 is provided with a roller 32 which is journaled at its end toward the frame 16. The roller 32 is captured by and rolls within a substantially C-shaped opening 34 provided on substantially the entire length of the frame 16. The angularly disposed connecting rod 30 has another roller 36 journaled at its other end on the same side of the connecting rod 30 as the journaled roller 32. The roller 36 is captured by and rolls within a substantially C-shaped opening 38 provided on a portion less than the entire length of the frame member 26. As the housing 18 moves horizontally from its stored position, as shown in FIG. 4, to its horizontal extension, as shown in FIG. 3, the connecting rod 30 will move from a generally perpendicular position to an angularly disposed position with respect to the frame 16. During that movement roller 32 will track within the C-shaped opening 34 from a position begining at the end of the C-shaped opening 34 opposite to that at which the housing 18 is traveling to the other end of the C-shaped opening 34 to be stopped thereby. Similarly, roller 36 will begin at the upper vertical end of the C-shaped opening 38 and will travel to the lower end of the C-shaped opening 38 to be stopped thereby. The action of the connecting rod 30 and its rollers 32 and 36 with the C-shaped openings 34 and 38 will both maintain the upright position of the housing 18 as it moves horizontally with respect to the roof 14 as well as limit the horizontal travel of the housing 18.

As before mentioned, the housing 18 in its horizontally extended position, as shown in FIG. 3, is free to be transported generally vertically downward by means of the second telescoping slidable arms 24 to the side of the automobile 12 to its loading and unloading position. As the housing 18 so moves vertically downward, the second telescoping slidable arms 24 will telescope outwardly from the frame member 26 to a point where the housing 18 comes to rest on a resilient means such a spring member 40 which is provided within the aft side 42 of the housing 18. The spring member 40 will encounter the upper side of the first telescoping slidable arms 22. The spring member 40 serves several purposes including the limiting of the vertically downward travel of the housing 18. In addition to that function, it provides a ready means to determine the weight of the objects that may have been added to the housing 18. As luggage, for example, is added to the housing 18, the spring member 40 will become more compressed. This direct relationship between the compression of the spring member 40 and the additional weight can be used to indicate the additional weight as well as provide an indication of an overweight situation. An overweight situation can cause the center of gravity of the vehicle to rise which will be reflected in the roll rate of the vehicle during turns due to centrifugal force. This could be accomplished by the provision of a pointer or some other color coded means (all not shown) which would indicate that point at which an excess of luggage has been added to the housing 18. In addition, a simple electrical circuit involving a connection to the automobile battery in series with a micro switch and an alarm could be utilized. As the weight again reaches a predetermined excessive level, the micro switch could be closed sounding the alarm possibly remote from the housing 18 such as within the automobile to warn of an excess luggage situation.

The housing 18 could be totally enclosed, i.e., the four sides and top and bottom. One or more of the sides or the top could be hingedly connected to the housing to allow ready access thereto. The housing 18 could be further provided with suitable locking means to both lock the hinged openings of the housing 18 as well as lock the entire housing 18 in its stored position, as shown in FIG. 4.

In addition, a power assist means (not shown) could be provided in which an electrical motor is connected in series to the automobile battery. The motor could be operatively connected to the housing 18 as by means of a simple sprocket and chain arrangement or drive belt arrangement (all not shown) which would assist in the movement of the housing 18 from its stored to its loading and unloading position and back again. Similarly, a counter weight mechanism (not shown) could be also operatively connected to the housing 18 to provide a counter weight force to the housing 18 when it is being lifted from its loading and unloading position to its stored position. As before mentioned, the first and second telescoping slidable arms 22 and 24 are generally analogous to the structure that effects the sliding action of filing cabinets and the like. As can be seen in FIG. 5, for example, the first telescoping slidable arms 22 slide upon and are supported by a series of spherical bearing members 44 which are held in position by cage members 46. Similarly, as can be seen in FIG. 6, the second telescoping slidable arms 24 slide upon and are supported by a series of spherical bearing members 48 which are held in position by cage members 50.

There is thus provided a roof top carrier embodying significant and important advantages over the prior art forms of roof top carriers. The roof top carrier of the present invention significantly expands and enlarges the luggage carrying capacity of automobiles without any significant affect on the performance or safety characteristics of the automobile. It provides for easy loading and unloading and storage of luggage without the use of any special equipment such as ladders or tools. It can be safely and securely locked in its stored position and can be fully enclosed to protect luggage from the elements. In its totality it offers a wide range of advantages not even contemplated by the prior art.

It is to be noted that the present invention is not to be limited to the specific details as herein described but is capable of other modifications anc changes without departing from the spirit and scope of the appended claims.

I claim:

1. A roof top carrier for vehicles comprising a frame to be supported by the roof of a vehicle, transport means supported by said frame, a housing supported by said transport means for transporting said housing away from its stored position on said roof down to the side of said vehicle to its loading and unloading position and back again to said stored position without any substantial change of the vertical or horizontal orientation of said housing, said transport means includes first and second telescoping slidable arms, said first telescoping slidable arms are slidably received and horizontally supported by said frame by bearings for transporting said housing generally horizontally away from said stored position on said roof of said vehicle, said second telescoping slidable arms are slidably received and vertically supported by a frame member by bearings, said frame member carried by said first telescoping slidable arms for transporting said housing generally vertically down to the side of said vehicle to its loading and unloading position, first travel limiting means is provided on said first telescoping slidable arms to limit the horizontal travel of said housing away from said stored position on said roof of said vehicle, second travel limiting means is provided on said second telescoping slidable arms to limit the vertical travel of said housing down to the side of said vehicle to its loading and unloading position, said frame comprises a plurality of members at least two of which members are substantially parallel to each other and are positioned on said roof perpendicular to the longitudinal axis of said vehicle, there being one each of said parallel members fore and aft of said housing when it is in its stored position, said first telescoping slidable arms include telescoping slidable arms received within said parallel frame members, said parallel frame members being generally horizontal with respect to said vehicle roof, there are at least two first telescoping slidable arms telescopingly received within each said parallel frame member, at least one of said first telescoping slidable arms is horizontally fixedly attached to said housing, said horizontally fixedly attached telescoping slidable arm being horizontally slidably removable from said other telescoping slidable arm received within said parallel frame members, said housing being free to be transported generally vertically downward by said second telescoping slidable arms to the side of said vehicle to its loading and unloading position when said horizontally fixedly attached telescoping slidable arm is so removed from said other telescoping slidable arms.

2. A roof top carrier for vehicles in accordance with claim 1 wherein said frame members carried by said first telescoping slidable arms are vertical thereto, there being one each said vertical frame member fore and aft of said housing.

3. A roof top carrier for vehicles in accordance with claim 2 wherein there are at least two second telescoping slidable arms telescopingly received within each said vertical frame members.

4. A roof top carrier for vehicles in accordance with claim 3 wherein at least one of said second telescoping slidable arms is vertically fixedly attached to said housing for transporting said housing generally vertically downward to the side of said vehicle to its loading and unloading position.

5. A roof top carrier for vehicles in accordance with claim 4 wherein said housing is a box like structure having at least two sides and a bottom for the storage of objects.

6. A roof top carrier for vehicles in accordance with claim 5 wherein there are one each first telescoping slidable arms horizontally fixedly attached to the fore and aft sides of said housing.

7. A roof top carrier for vehicles in accordance with claim 6 wherein there are one each second telescoping slidable arms vertically fixedly attached to the fore and aft sides of said housing.

8. A roof top carrier for vehicles in accordance with claim 7 wherein said first travel limiting means includes a connecting rod connecting one of said parallel frame members and one of said vertical frame members.

9. A roof top carrier for vehicles in accordance with claim 8 wherein there are two said connecting rods, one each connecting one said parallel frame member and said vertical frame member on the fore and aft sides of said housing.

10. A roof top carrier for vehicles in accordance with claim 9 wherein the end of said connecting rods connected to said parallel frame members are each provided with a roller journaled thereon which roller is captured by and rolls within a substantially "C" shaped opening provided on substantially the entire length of said parallel frame members.

11. A roof top carrier for vehicles in accordance with claim 10 wherein the end of said connecting rods connected to said vertical frame members are each provided with a roller journaled thereon which roller is captured by and rolls within a substantially "C" shaped opening provided on a portion less than the entire length of said vertical frame members.

12. A roof top carrier for vehicles in accordance with claim 11 wherein said bearings slidably supporting said first telescoping slidable arms on said parallel frame members are spherical balls maintained in rolling relation with said parallel frame members and said first telescoping slidable arms by cage members.

13. A roof top carrier for vehicles in accordance with claim 1 wherein locking means are provided to lock said housing to said frame when said housing is in its stored position.

14. A roof top carrier for vehicles in accordance with claim 1 wherein power assist means is provided to assist the movement of said housing from its stored position to its loading and unloading position and back again.

15. A roof top carrier for vehicles in accordance with claim 12 wherein said housing has four sides and a top and bottom, at least one said side being hingedly connected to said housing to present an opening for the storage and removal of objects within said housing.

* * * * *